United States Patent
Maida et al.

(10) Patent No.: US 7,263,910 B2
(45) Date of Patent: Sep. 4, 2007

(54) TILT CONTROL LEVER ASSEMBLY FOR STEERING COLUMN

(75) Inventors: Robert D. Maida, Pinconning, MI (US); Steven P. Finkbeiner, Essexville, MI (US)

(73) Assignee: Delphi Technologies, Inc., Troy, MI (US)

( * ) Notice: Subject to any disclaimer, the term of this patent is extended or adjusted under 35 U.S.C. 154(b) by 104 days.

(21) Appl. No.: 11/007,519

(22) Filed: Dec. 8, 2004

(65) Prior Publication Data

US 2005/0145056 A1 Jul. 7, 2005

Related U.S. Application Data

(60) Provisional application No. 60/527,932, filed on Dec. 8, 2003.

(51) Int. Cl.
*B62D 1/18* (2006.01)
(52) U.S. Cl. .................................. 74/493; 74/492
(58) Field of Classification Search .................. 74/492, 74/493, 527, 526, 533, 532; 280/775
See application file for complete search history.

(56) References Cited

U.S. PATENT DOCUMENTS

| 4,224,236 | A |   | 9/1980  | Wunder |
| 4,244,237 | A |   | 1/1981  | Sprunger |
| 4,265,139 | A | * | 5/1981  | Logemann ................... 74/485 |
| 4,279,176 | A |   | 7/1981  | Minamitani |
| 4,396,207 | A | * | 8/1983  | Okamoto ..................... 280/775 |
| 4,424,721 | A |   | 1/1984  | Deacon |
| 4,470,322 | A |   | 9/1984  | Beauch |
| 4,649,769 | A |   | 3/1987  | Venable |
| 4,656,887 | A |   | 4/1987  | Yoshida |
| 4,722,241 | A |   | 2/1988  | Yoshida |
| 4,723,461 | A |   | 2/1988  | Yoshida |
| 4,753,121 | A | * | 6/1988  | Venable et al. ............... 74/493 |
| 4,793,204 | A | * | 12/1988 | Kubasiak ..................... 74/493 |
| 4,892,330 | A |   | 1/1990  | Beauch |
| 4,972,732 | A |   | 11/1990 | Venable |
| 4,976,167 | A |   | 12/1990 | Venable |
| 4,981,049 | A | * | 1/1991  | Venable et al. ............... 74/493 |
| 5,222,410 | A |   | 6/1993  | Kinoshita |
| 5,339,706 | A |   | 8/1994  | Freeman |

(Continued)

FOREIGN PATENT DOCUMENTS

| EP | 0289795 | 9/1988 |
| EP | 0900943 | 10/1999 |

*Primary Examiner*—Richard Ridley
*Assistant Examiner*—Matthew A. Johnson
(74) *Attorney, Agent, or Firm*—Michael D. Smith

(57) ABSTRACT

The invention provides a steering column for a vehicle. The steering column includes a steering column jacket defining a column axis. The steering column jacket is operable to at least partially encircle a steering shaft in a vehicle. The steering column also includes a tilt housing engaged with the steering column jacket for tilting movement about a tilt axis between a plurality of tilt positions. The steering column also includes a locking member supported for linear movement by the tilt housing. The locking member has a tip moveable outwardly with respect to the column axis to a locked position contacting the steering column jacket and inwardly towards the column axis to an unlocked position spaced from the steering column jacket.

15 Claims, 10 Drawing Sheets

U.S. PATENT DOCUMENTS

| | | |
|---|---|---|
| 5,426,994 A * | 6/1995 | Khalifa et al. ............ 74/493 |
| 5,439,252 A * | 8/1995 | Oxley et al. ............ 280/775 |
| 5,566,585 A | 10/1996 | Snell |
| 5,570,610 A | 11/1996 | Cymbal |
| 5,743,151 A * | 4/1998 | Khalifa et al. ............ 74/493 |
| 5,915,726 A | 6/1999 | Hibino |
| 6,035,739 A | 3/2000 | Milton |
| 6,092,957 A | 7/2000 | Fevre et al. |
| 6,167,777 B1 | 1/2001 | Snell |
| 6,189,405 B1 * | 2/2001 | Yazane ............ 74/493 |
| 6,205,882 B1 | 3/2001 | Jolley |
| 6,223,620 B1 | 5/2001 | Jolley |
| 6,244,128 B1 | 6/2001 | Spencer |
| 6,272,945 B1 | 8/2001 | Jolley |
| 6,460,427 B1 | 10/2002 | Hedderly |
| 6,467,367 B2 | 10/2002 | Kim |
| 6,543,807 B2 * | 4/2003 | Fujiu et al. ............ 280/775 |
| 6,591,709 B1 | 7/2003 | Kim |
| 6,640,661 B2 | 11/2003 | Duncan |
| 6,725,739 B2 | 4/2004 | Bannon |
| 6,758,494 B2 | 7/2004 | Bannon |
| 2002/0020244 A1 | 2/2002 | Janeczko et al. |
| 2004/0159173 A1 * | 8/2004 | Sawada ............ 74/492 |

* cited by examiner

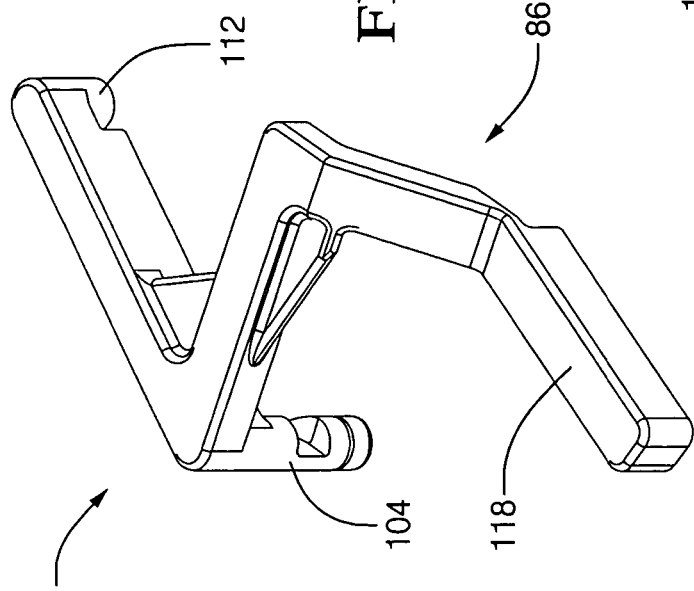
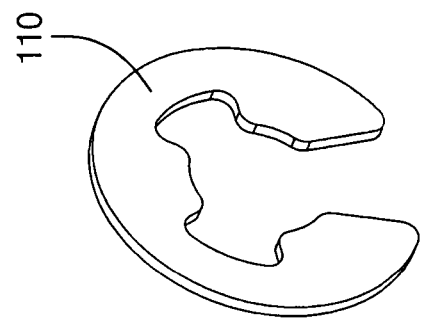
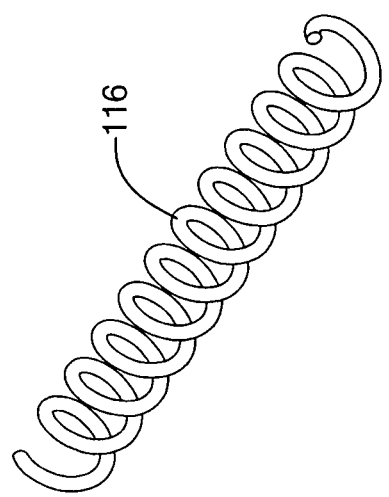
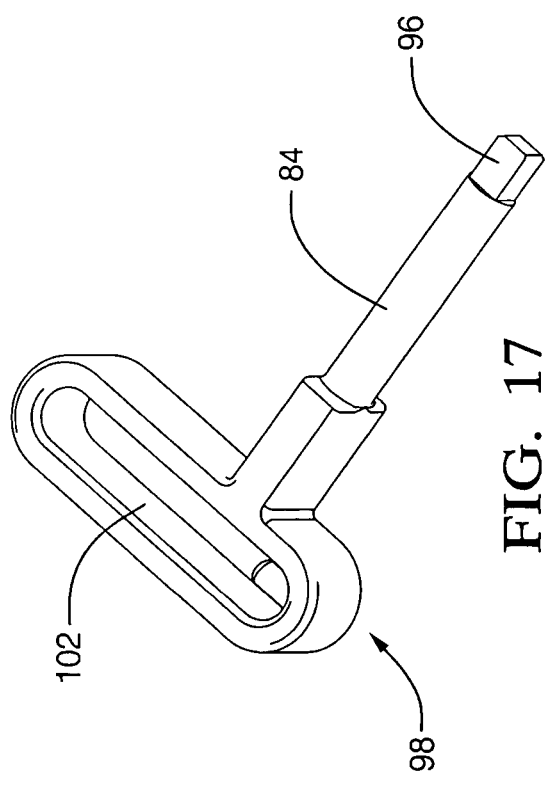
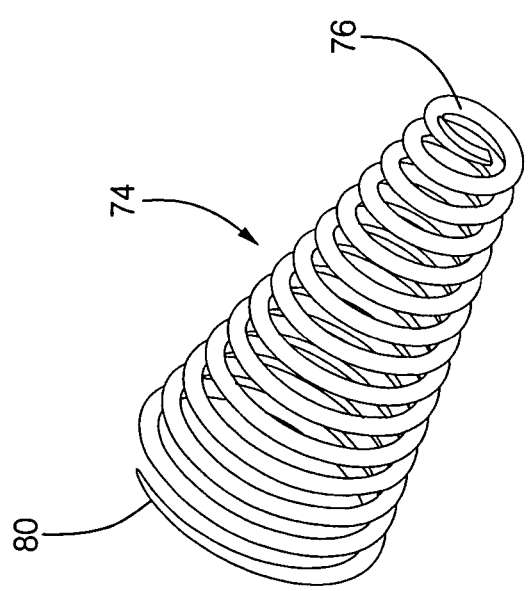

TILT CONTROL LEVER ASSEMBLY FOR STEERING COLUMN

This invention claims priority to U.S. Provisional Application No. 60/527,932, filed Dec. 8, 2003.

FIELD OF THE INVENTION

The invention relates to a steering column for a vehicle and, more specifically, relates to a control mechanism for selectively tilting a tilt housing in a steering column assembly relative to an inner column jacket.

BACKGROUND OF THE INVENTION

It can be desirable to tilt a steering wheel in a motor vehicle to accommodate different operators of the motor vehicle. Specifically, the position of the steering wheel relative to the steering column can be changed to enhance the operator's comfort and the operator's control of the vehicle. The steering column can support a steering wheel with a tilt housing that is rotatable relative to another component of the steering column, such as an inner column jacket. However, current mechanisms for controlling the position of the steering wheel relative to the steering column are not as efficient as desired.

SUMMARY OF THE INVENTION AND ADVANTAGES

The invention provides a steering column for a vehicle. The steering column includes a steering column jacket defining a column axis. The steering column jacket is operable to at least partially encircle a steering shaft in a vehicle. The steering column also includes a tilt housing engaged with the steering column jacket for tilting movement about a tilt axis between a plurality of tilt positions. The steering column also includes a locking member supported for linear movement by the tilt housing. The locking member has a tip moveable outwardly with respect to the column axis to a locked position contacting the steering column jacket and inwardly towards the column axis to an unlocked position spaced from the steering column jacket.

BRIEF DESCRIPTION OF THE DRAWINGS

Other advantages of the present invention will be readily appreciated as the same becomes better understood by reference to the following detailed description when considered in connection with the accompanying drawings wherein:

FIG. 17 is a perspective view of a locking according to the exemplary embodiment of the invention;

FIG. 18 is a perspective view of a tilt lever according to the exemplary embodiment of the invention;

FIG. 19 is a perspective view of a first spring according to the exemplary embodiment of the invention;

FIG. 20 is a perspective view of a second spring according to the exemplary embodiment of the invention;

FIG. 21 is a perspective view of a retaining ring according to the exemplary embodiment of the invention;

DETAILED DESCRIPTION OF THE PREFERRED EMBODIMENT

Figure 1:
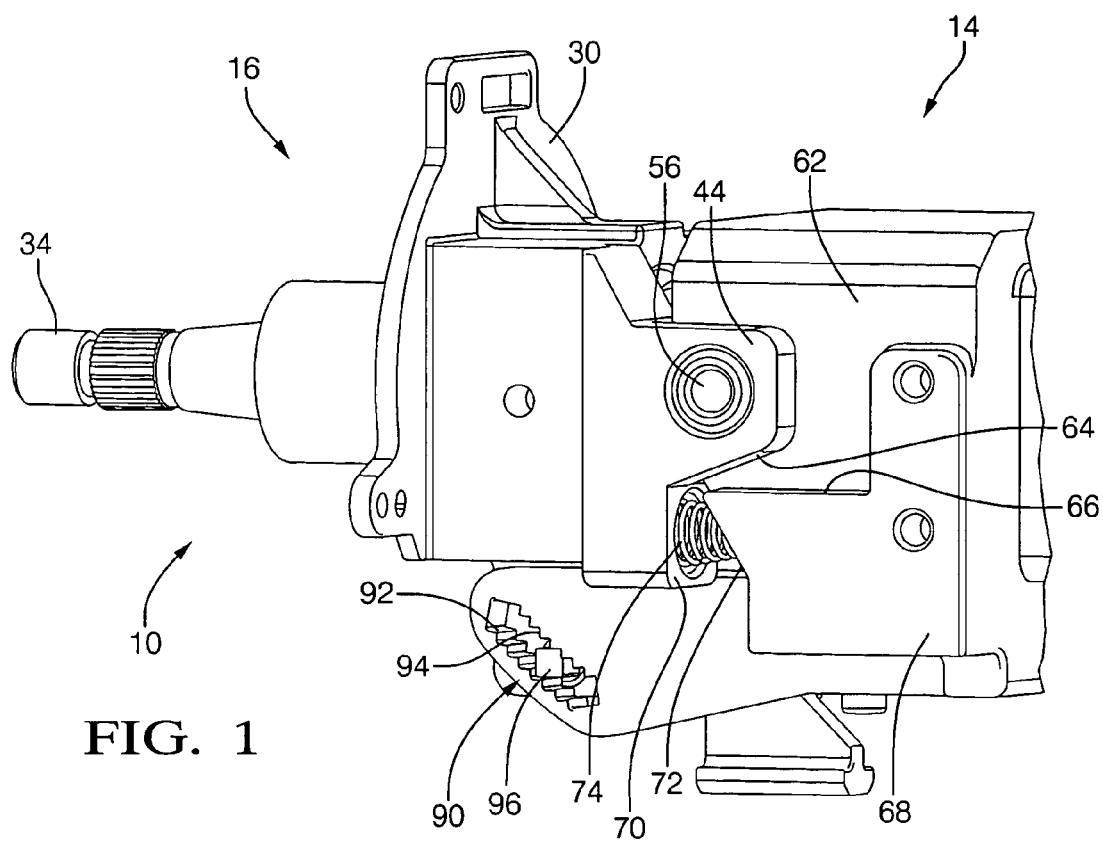
FIG. 1 is a perspective view showing a right-hand side of a tilt housing rotatably associated with an inner column jacket.
Figure 2:
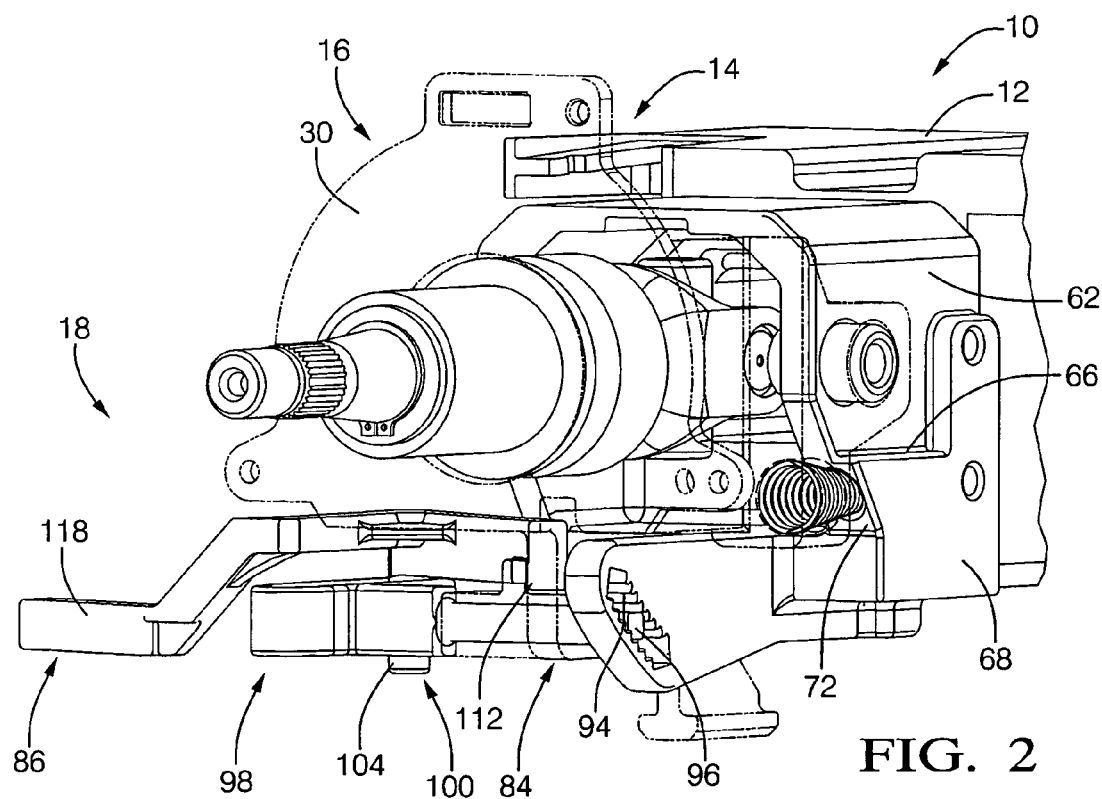
FIG. 2 is a perspective view showing a front side of the tilt housing and the inner column jacket shown in FIG. 1 and also shows a tilt control lever assembly in the locked position according to the exemplary embodiment of the present invention.
Figure 3:
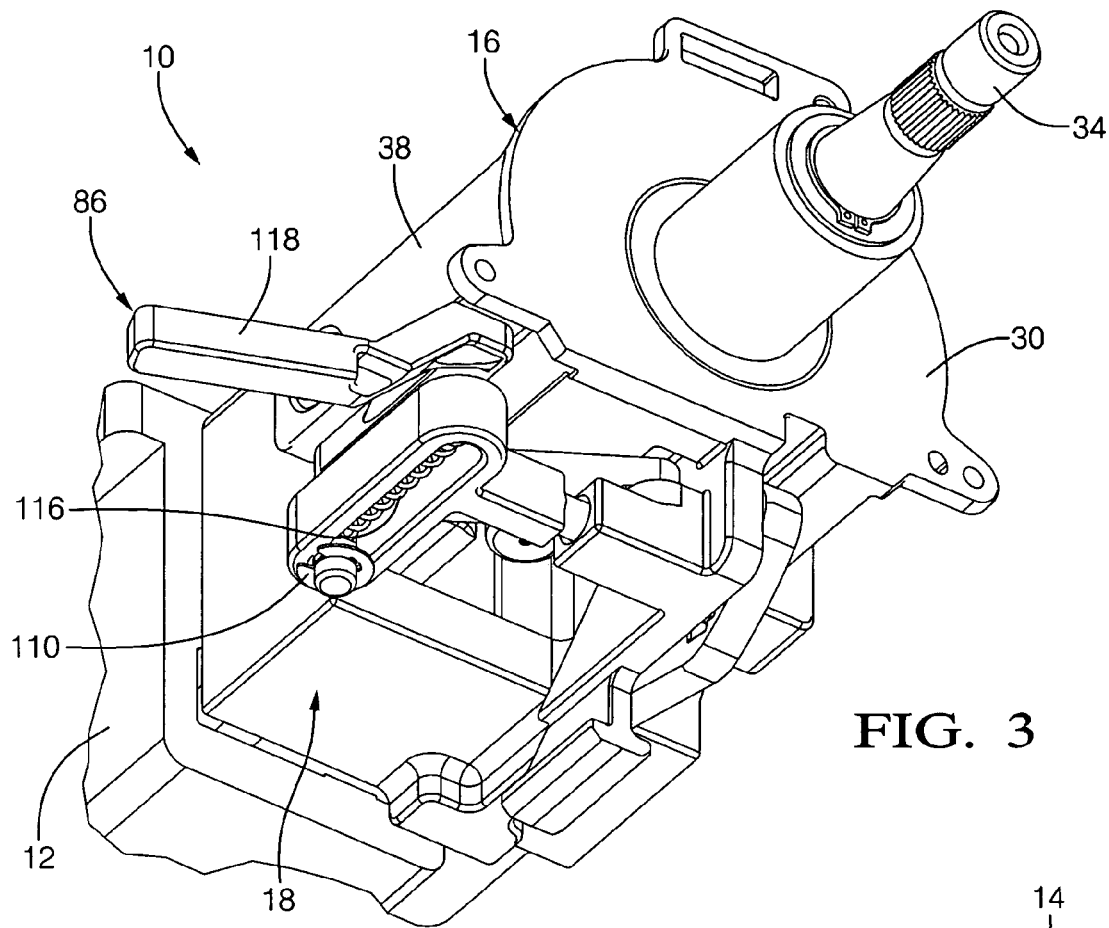
FIG. 3 is a perspective view showing a lower, left-hand side of the exemplary embodiment of the invention shown in FIGS. 1 and 2.

Referring now to FIGS. 1 and 2, a tilt and telescope steering column assembly 10 includes an outer column jacket 12 and an inner column jacket 14. The inner column jacket 14 is slidably received by the outer column jacket 12 and is selectively movable with respect to the outer column jacket 12 to provide telescopic adjustment of the inner column jacket 14 relative to the outer column jacket 12. A tilt housing 16 is rotatably associated with the inner column jacket 14. According to a particular feature of the invention, the tilt housing 16 is selectively tiltable relative to the inner column jacket 14. Tilting adjustments of the tilt housing 16 relative to the inner column jacket 14 are controlled by a tilt control lever assembly 18.

Figure 22:
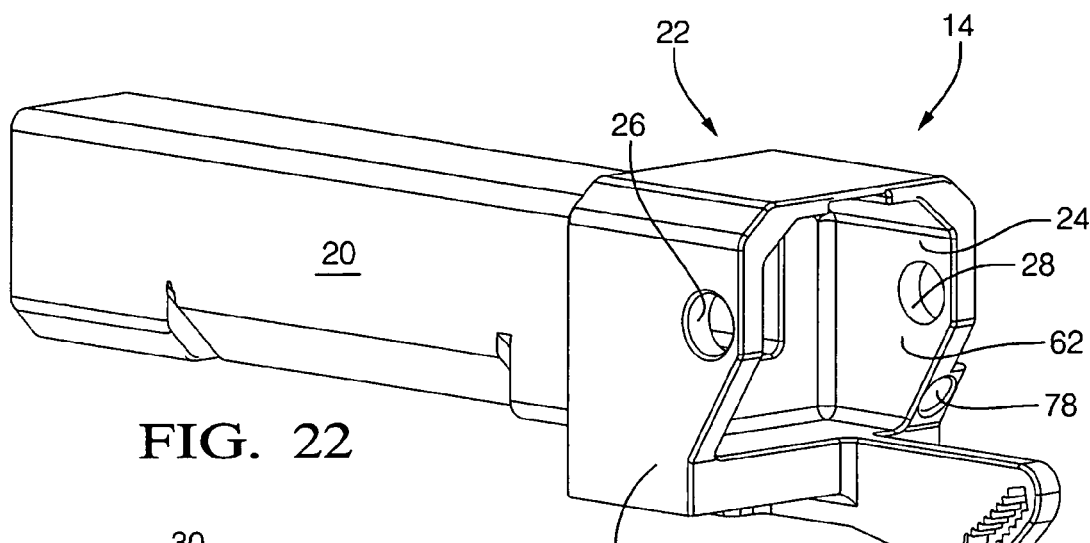
FIG. 22 is a perspective view of the inner column jacket according to the exemplary embodiment of the invention.

Referring now to FIGS. 1 and 22, the inner column jacket 14 includes a body portion 20 and a receiving portion 22. The body portion 20 is received by a correspondingly shaped aperture defined by the outer column jacket 12 for sliding movement relative to the outer column jacket 12. The receiving portion 22 is not received in the aperture defined by the outer column jacket 12 in the exemplary embodiment of the invention. The receiving portion 22 is rotatably connected to the tilt housing 16 and defines a cavity 24 for receiving at least a portion of the tilt housing 16 and a pair of aligned apertures 26, 28 for defining an axis of rotation between the tilt housing 16 and the receiving portion 22.

Figure 9:
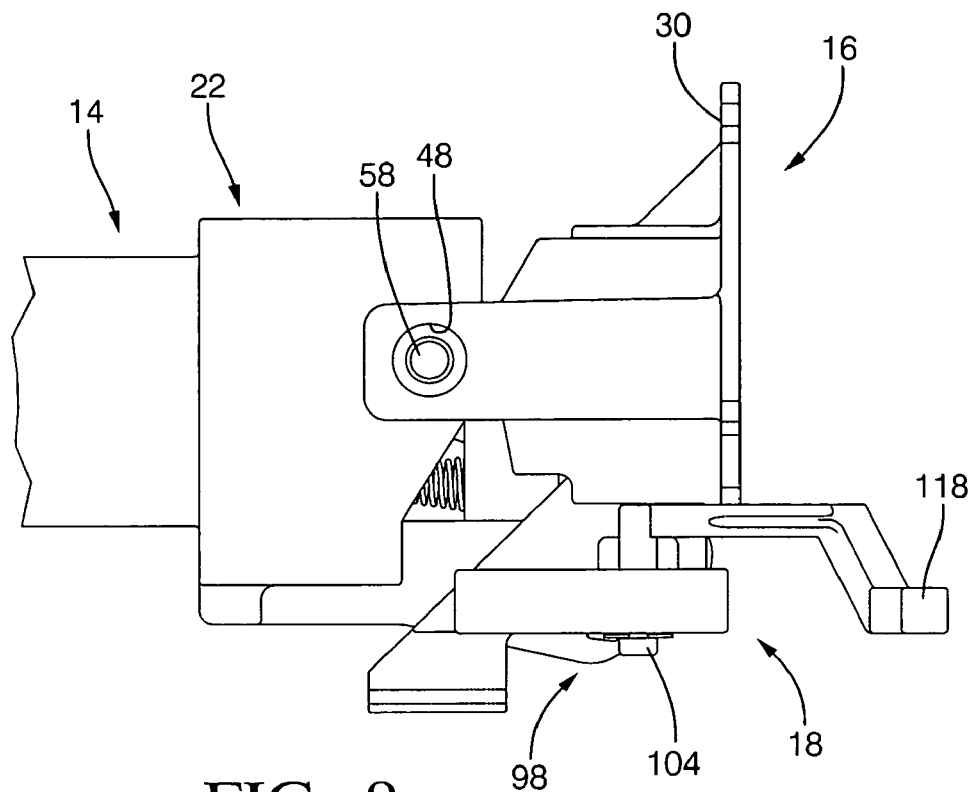
FIG. 9 is a left-hand side view of the exemplary embodiment of the invention wherein the tilt control lever assembly is in an unlocked position.
Figure 10:
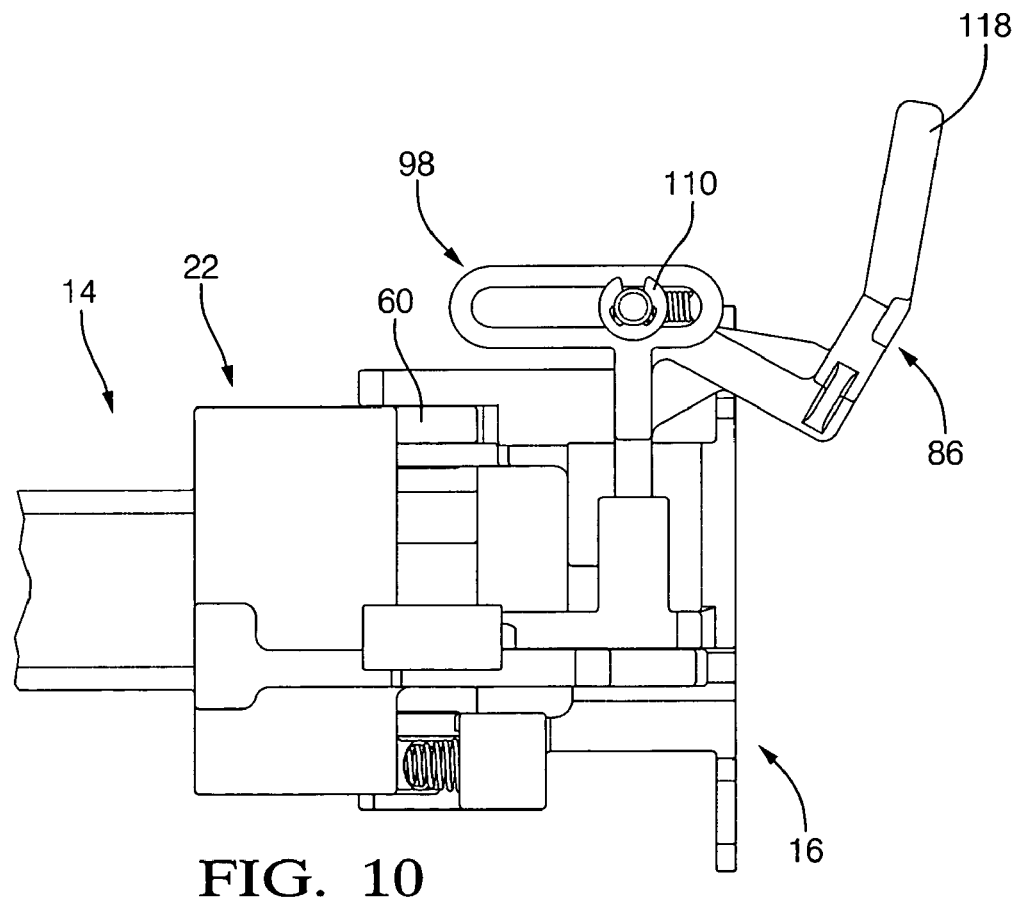
FIG. 10 is a bottom view corresponding to the side view in FIG. 9.
Figure 11:
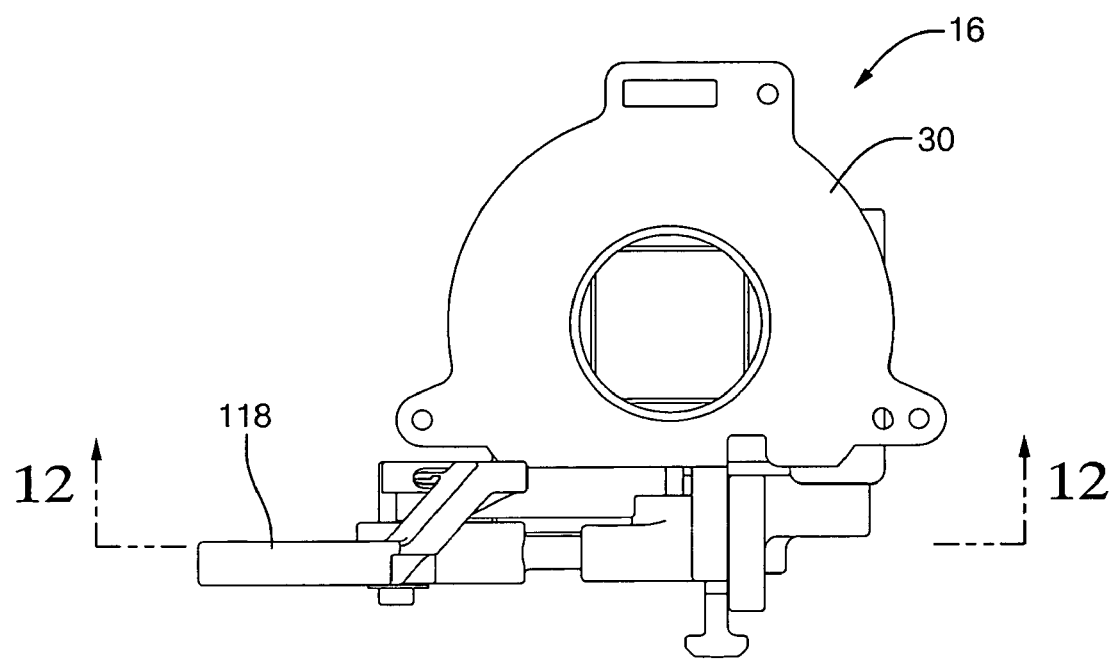
FIG. 11 is a front view corresponding to the views in FIGS. 9 and 10.

Referring now to FIGS. 1 and 22-24, the tilt housing 16 includes a face plate 30 and defines a shaft aperture 32. When the steering column 10 is assembled to a vehicle, a steering shaft 34 for connection to a steering wheel extends through the shaft aperture 32. The tilt housing 16 also includes first and second yokes 36, 42. The first yoke 36 includes projections 38 and 40. The second yoke 42 includes projections 44 and 46. The projections 38, 40, 44, 46 define apertures 48, 50, 52, 54, respectively. When the tilt housing 16 is rotatably assembled with respect to the inner column jacket 14, the apertures 48, 50, 52, 54 are coaxially aligned with the apertures 26, 28 shown in FIG. 22. A pin 56, shown in FIG. 1, is inserted in the apertures 52, 28 and 54 when the tilt housing 16 is rotatably assembled to the inner column jacket 14. Likewise, a pin 58, shown in FIG. 9, is inserted in the apertures 48, 26 and 50 when the tilt housing 16 is rotatably assembled to the inner column jacket 14. When the tilt housing 16 is rotatably associated with the inner column jacket 14, a sidewall 60 if the inner column jacket 14 is disposed between the projections 38, 40 of the first yoke 36. Similarly, a sidewall 62 of the inner column jacket 14 is disposed between the projections 44, 46 of the second yoke 42.

Referring now to FIG. 1, the tilt housing 16 is rotatable with respect to the inner column jacket 14 about an axis of rotation defined by the pins 56, 58. The tilt housing 16 is rotatable between first and second end limits of travel. Several angular stop positions or tilt settings, can be defined along the path of rotational movement of the tilt housing 16 relative to the inner column jacket 14. A first end limit of travel is defined when an engaging surface 64, defined by the projection 44, contacts and engages an engaging surface 66 defined by a transverse projection 68 extending from the sidewall 62. The second end limit of travel is defined when a second engaging surface 70, defined by the tilt housing 16, engages a second engaging surface 72 defined by the transverse projection 68.

Referring now to FIGS. 1 and 19, the assembly 10 includes a first spring 74 positioned between the tilt housing 16 and the inner column jacket 14. The spring 74 urges the tilt housing 16 toward the first end limit of travel. When the steering column assembly 10 is assembled to a vehicle, the first spring 74 will or urge the steering wheel upwardly.

The spring 74 can be a variable rate spring to enhance the operation of the steering column assembly 10. For example, it may be desirable to urge the tilt housing 16 toward the first end limit of travel at a constant rate along the rotational path of movement of the tilt housing. A constant rate spring would exert an increasing amount of force in response to an increasing amount of compression.

Referring now to FIGS. 19 and 22-24, a first end 76 of the spring 74 can be received in a blind receiving aperture 78 defined by the transverse projection 68. A second end 80 of the spring 74 can be received in a blind receiving aperture 82 defined by the tilt housing 16, adjacent the second yoke 42.

Figure 4:
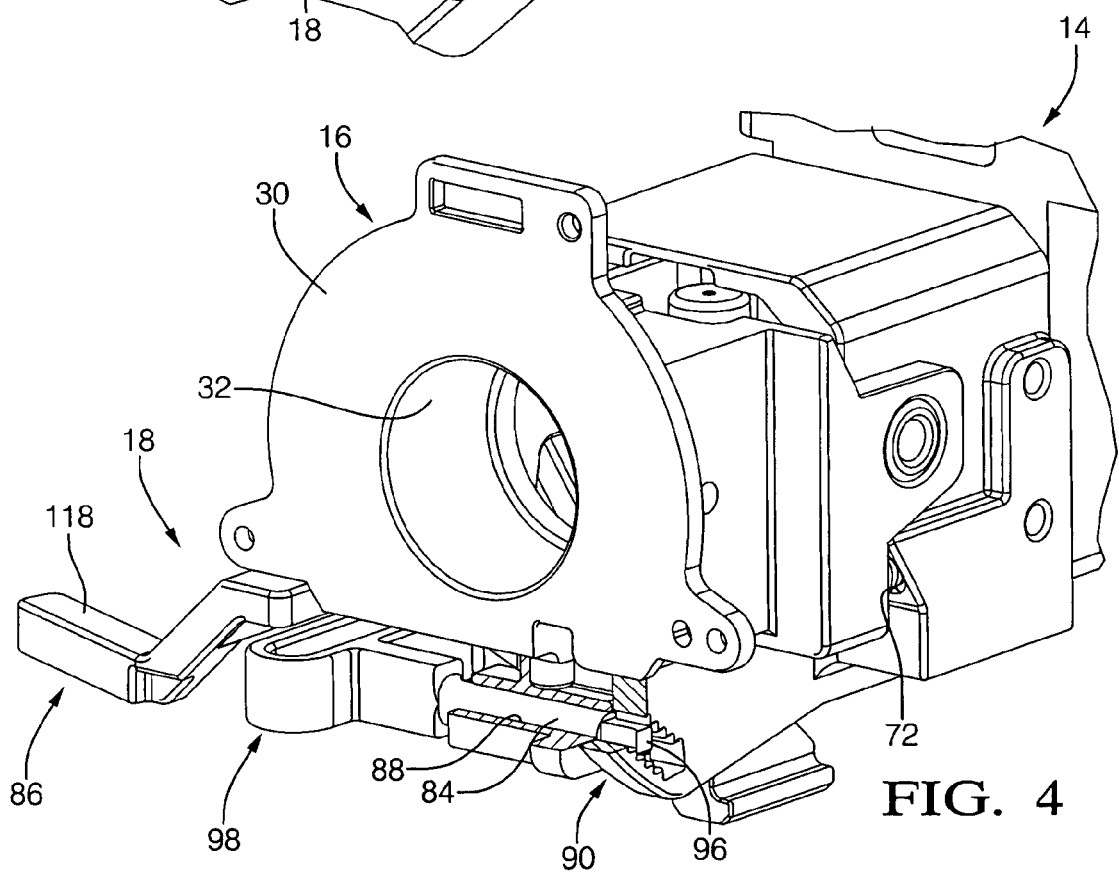
FIG. 4 is a perspective view showing the right-hand side of a partial cross-section of the tilt housing, the inner column jacket, and the tilt control lever assembly in the locked position.
Figure 6:
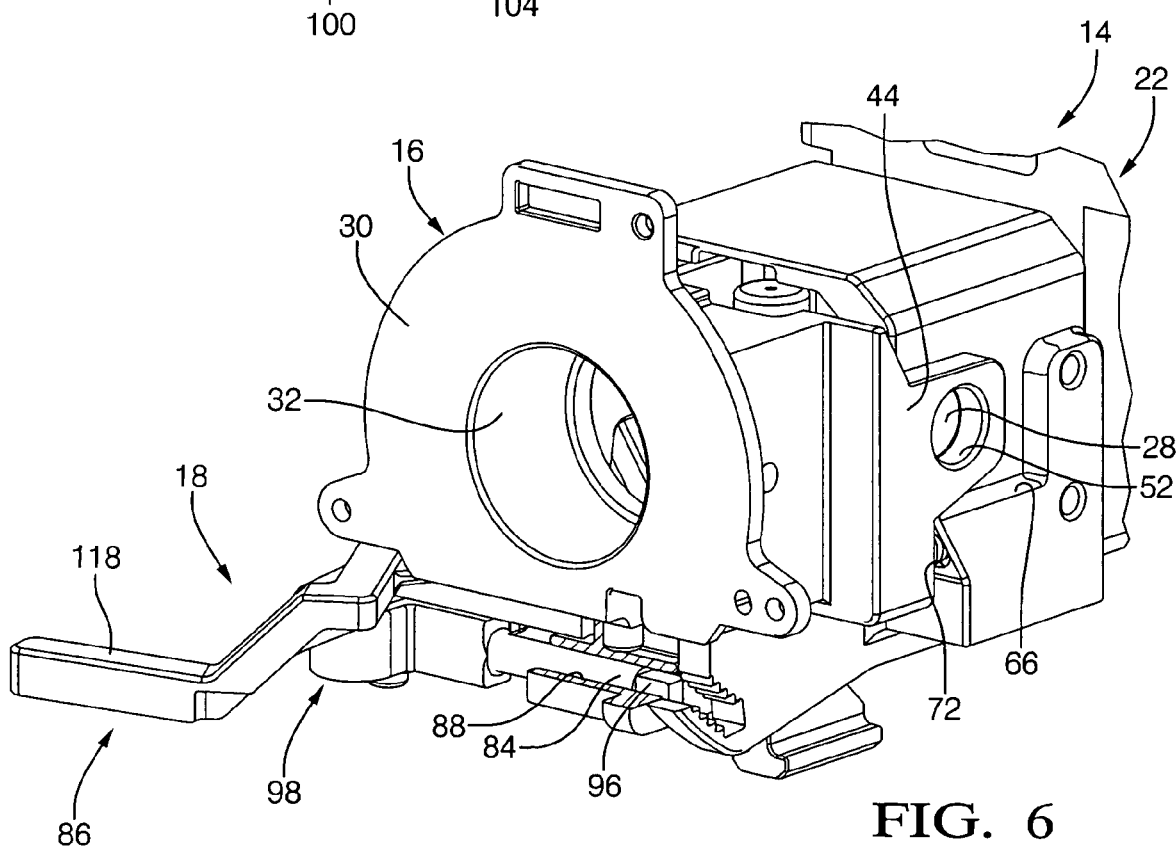
FIG. 6 is a perspective view showing the right-hand side of a partial cross-section of the tilt housing, the inner column jacket, and the tilt control lever assembly in the unlocked position.
Figure 12:
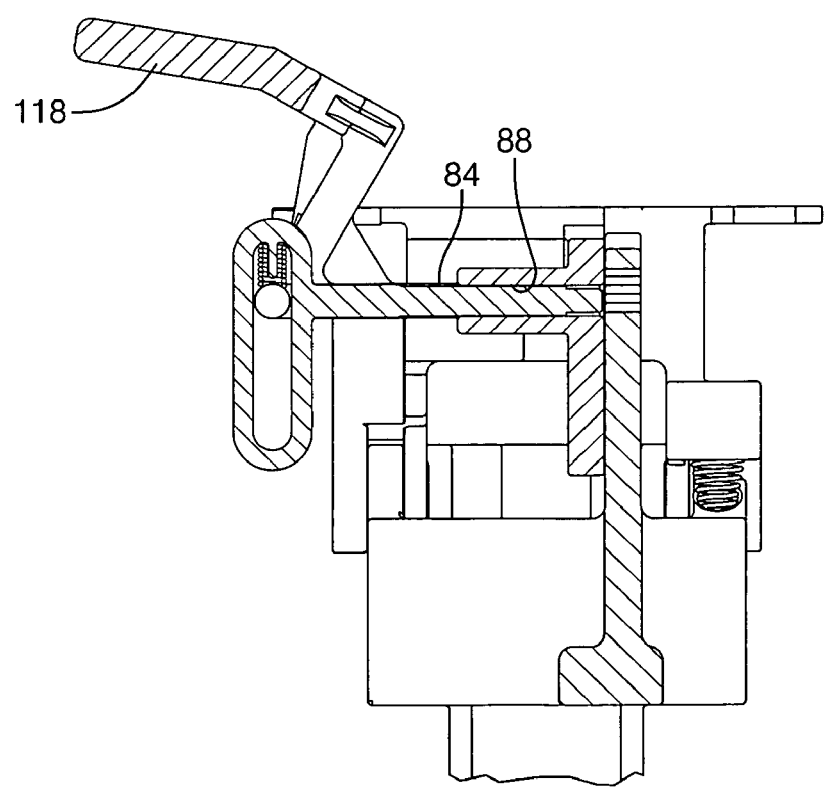
FIG. 12 is a partial cross-sectional view taken along the sectional line in FIG. 11.
Figure 13:
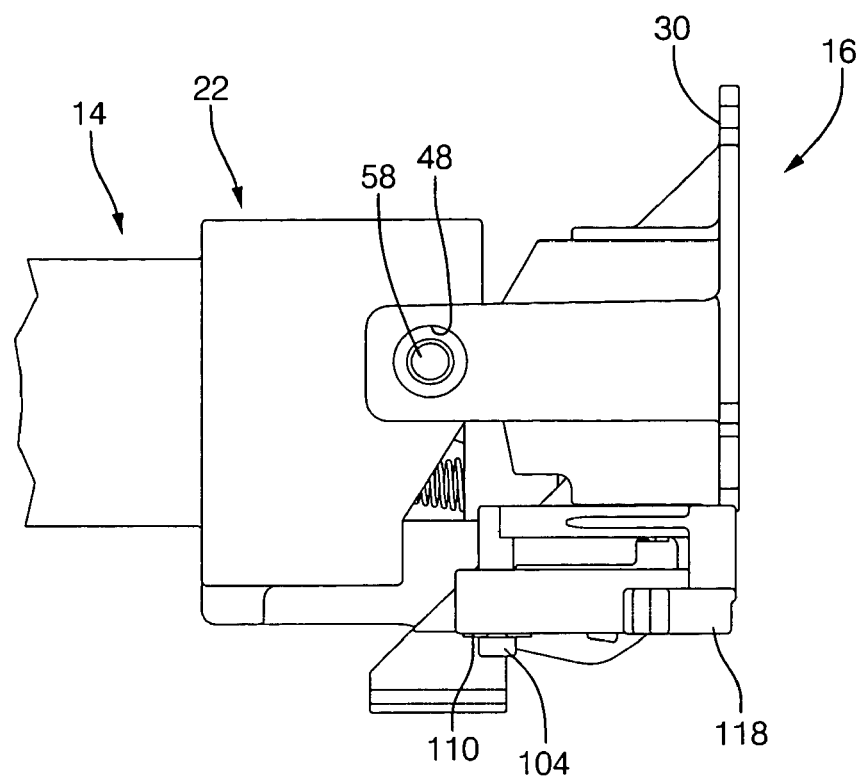
FIG. 13 is a left-hand side view of the exemplary embodiment of the invention wherein the tilt control lever assembly is in a locked position.
Figure 14:
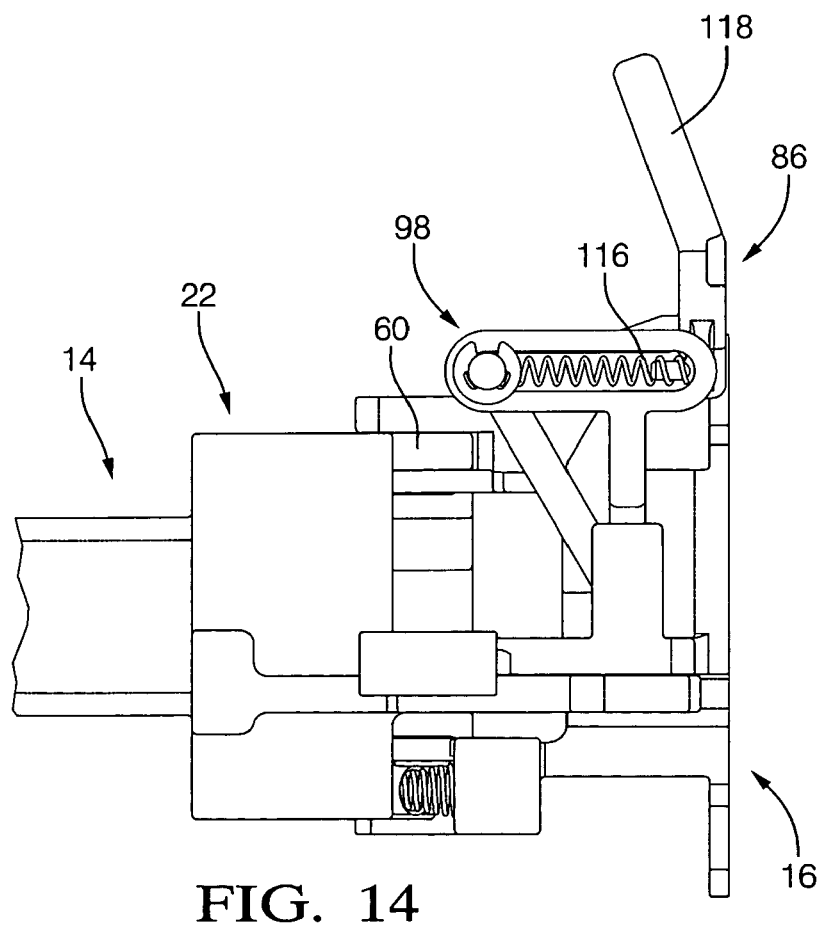
FIG. 14 is a bottom view corresponding to the side view in FIG. 13.
Figure 15:
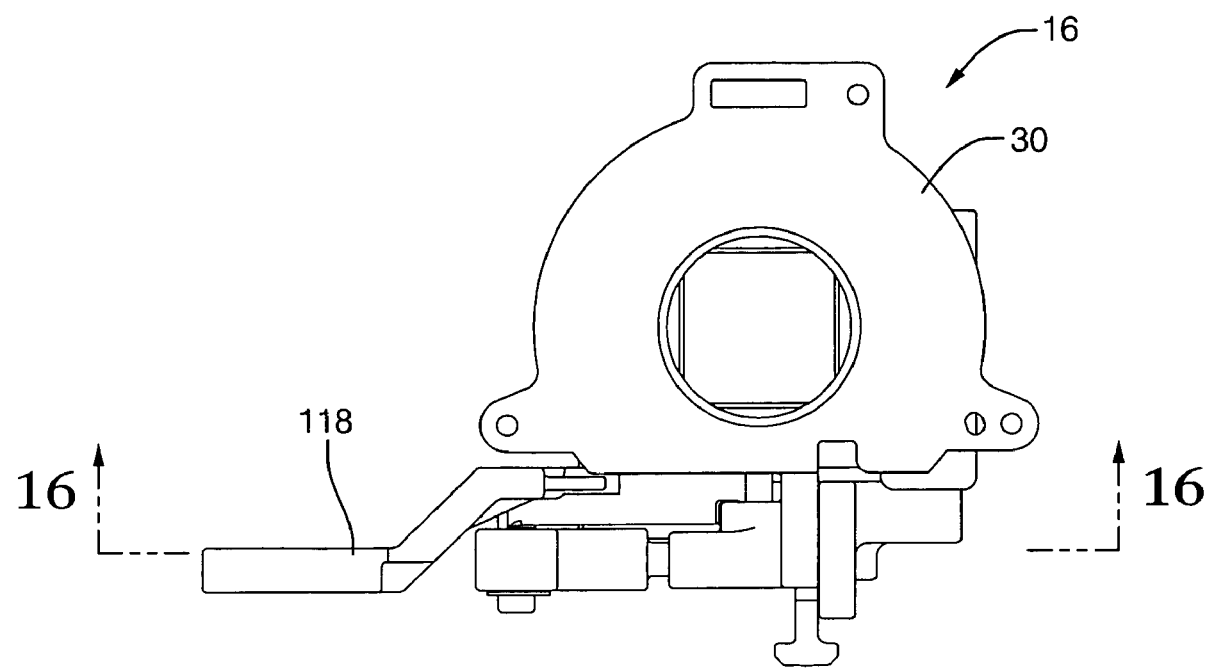
FIG. 15 is a front view corresponding to the views in FIGS. 13 and 14.
Figure 16:
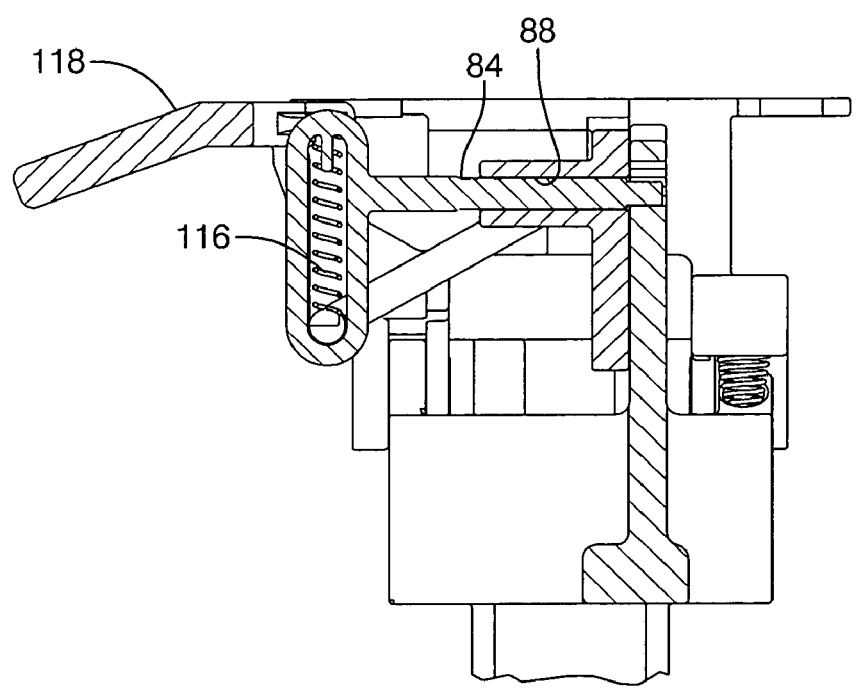
FIG. 16 is a partial cross-sectional view taken along the sectional line in FIG. 15.

Referring now to FIGS. 4 and 6, the assembly 10 includes the tilt control lever assembly 18 to selectively control rotational movement between the tilt housing 16 and the inner column jacket 14. The assembly 18 includes a locking member or pin 84 and a lever 86 for moving the pin 84 between a locked position and an unlocked position. The pin 84 moves linearly and passes through a transverse aperture 88 defined by the tilt housing 16. The pin 84 is selectively insertable in a slot 90 defined by the inner column jacket 14. When the pin 84 is inserted in the slot 90, the tilt housing 16 and the inner column jacket 14 are locked with respect to one another, best shown in FIGS. 2, 4 and 16. When the pin 84 is removed from the slot 90, the tilt housing 16 and the inner column jacket 14 are unlocked with respect to one another, best shown in FIGS. 6, 7 and 12, and the tilt housing 16 can rotate relative to the inner column jacket 14.

Referring now to FIGS. 1 and 6, the slot 90 extends along an arcuate path corresponding to the rotational path of movement of the tilt housing 16 relative to the inner column jacket 14. The aperture 88 is aligned with and communicates with the slot 90 throughout the movement of the tilt housing 16 between the first and second end limits of travel. The slot 90 defines corresponding step surfaces 92, 94, resulting in the slot 90 having wider and narrower portions. The individual steps of the step surfaces 92, 94 define angular stop positions or tilt settings along the rotational path of movement of the tilt housing 16, the wide portions being tilt positions and the narrower portions separating tilt positions. A tip 96 of the pin 84 is shaped to correspond to the shape of the individual steps of the step surfaces of 92, 94. In the exemplary embodiment of the invention, the tip 96 is rectangularly shaped and the individual steps of the step surfaces 92, 94 defined rectangular openings.

Figure 5:
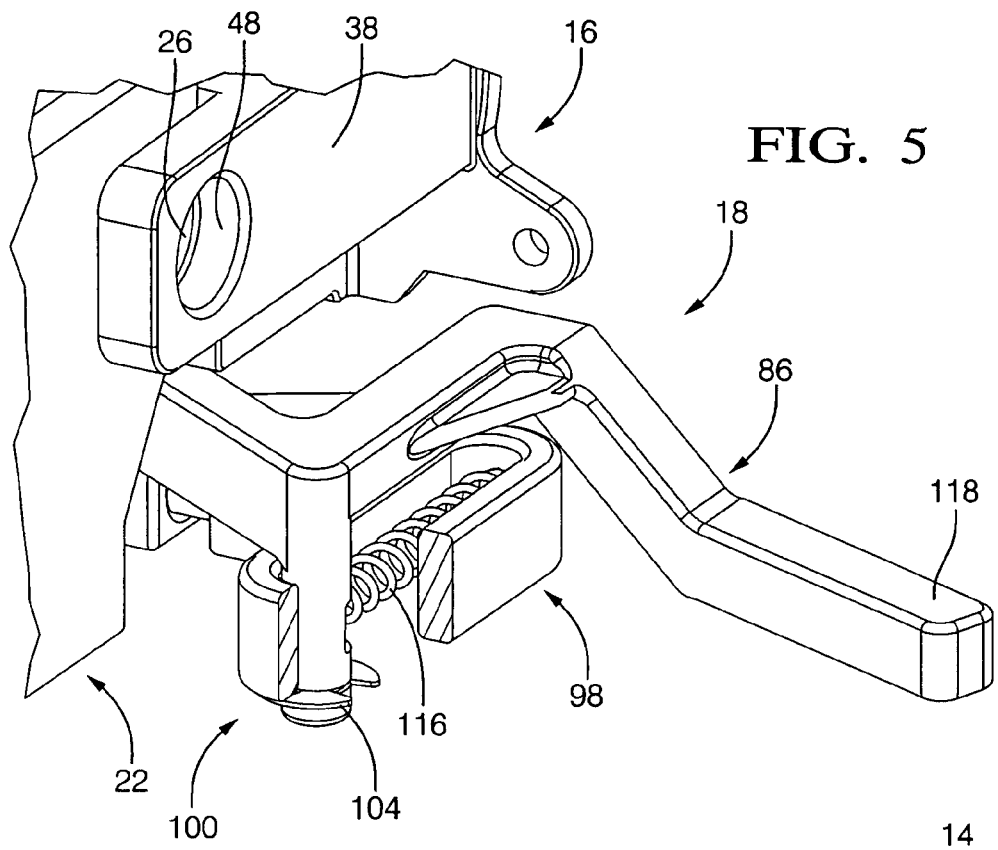
FIG. 5 is a partial cross-sectional, detailed view of the tilt control lever assembly shown in FIGS. 2-4.
Figure 7:
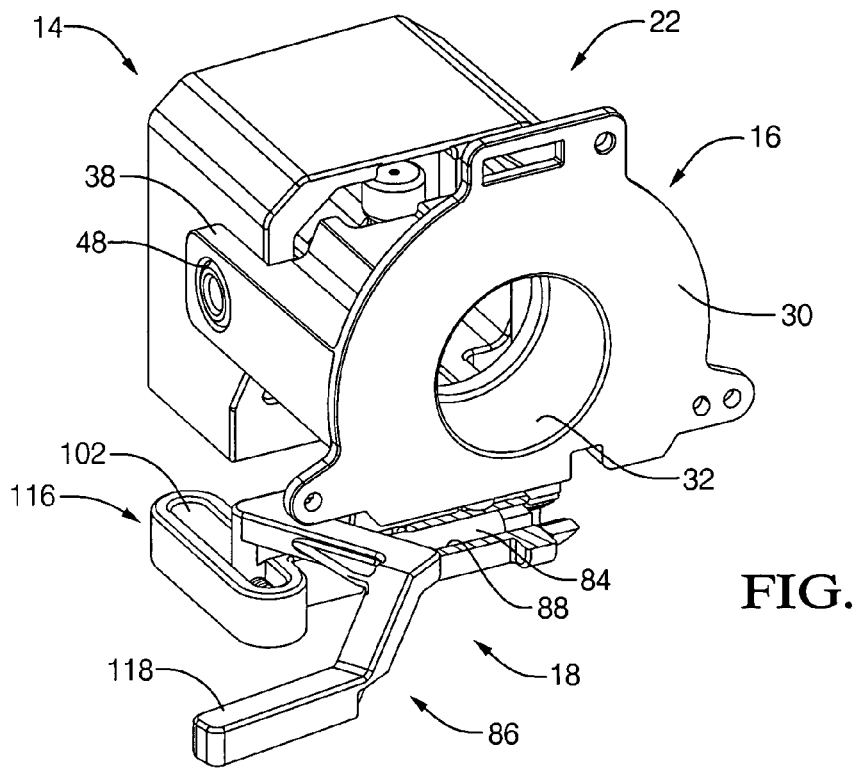
FIG. 7 is a left-hand perspective view of the structure shown in FIG. 6.
Figure 8:
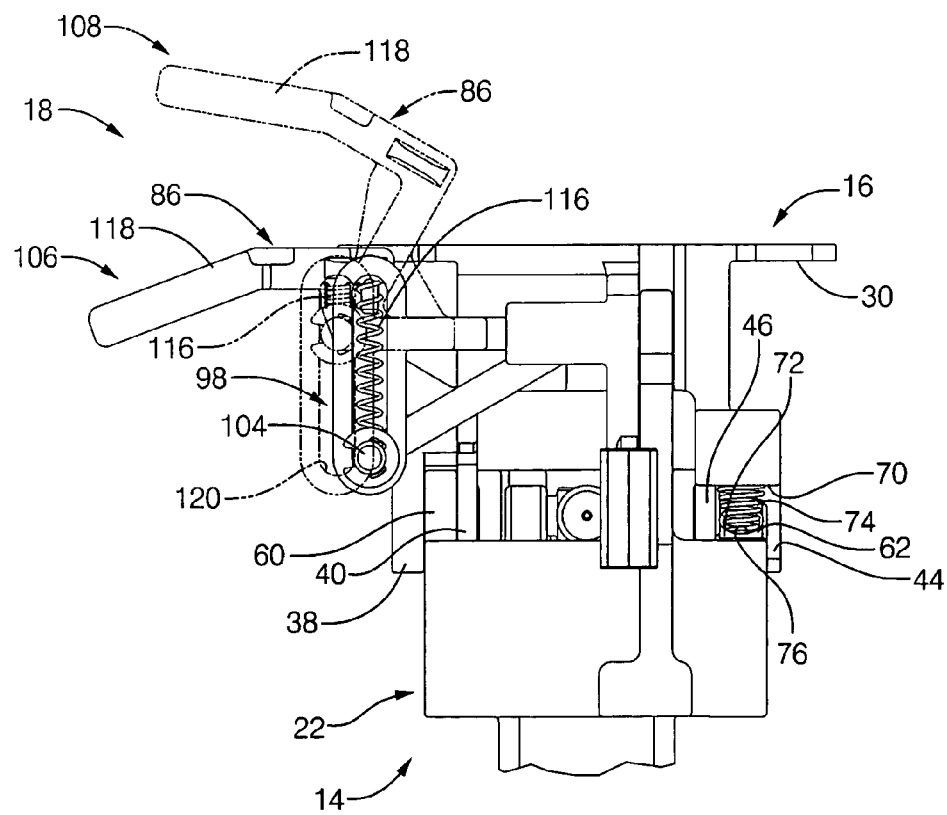
FIG. 8 is a bottom view of the tilt control lever assembly in locked and unlocked positions.

Referring now to FIGS. 5, 7 and 8, the pin 84 is moved between the locked position and the unlocked position by the lever 86. The pin 84 includes a cam follower portion 98 and the lever includes a cam portion 100. In the exemplary embodiment of the invention, the cam follower portion 98 includes a slot 102 and the cam portion 100 includes a pin 104. The pin 104 pierces the slot 102 and moves the cam follower portion 98 in response to rotation of the lever 86.

As best seen in FIG. 8, the lever 86 is rotatable between a locked position designated at 106 and an unlocked position designated at 108. When the lever 86 is at the locked position 106, the tip 96 is positioned in the slot 90. When the lever 86 is at the unlocked position 108, the tip 96 is retracted from the slot 90. A retaining ring 110 can be affixed to a distal end of the pin 104 to prevent the pin 104 from moving out of the slot 102.

Figure 23:
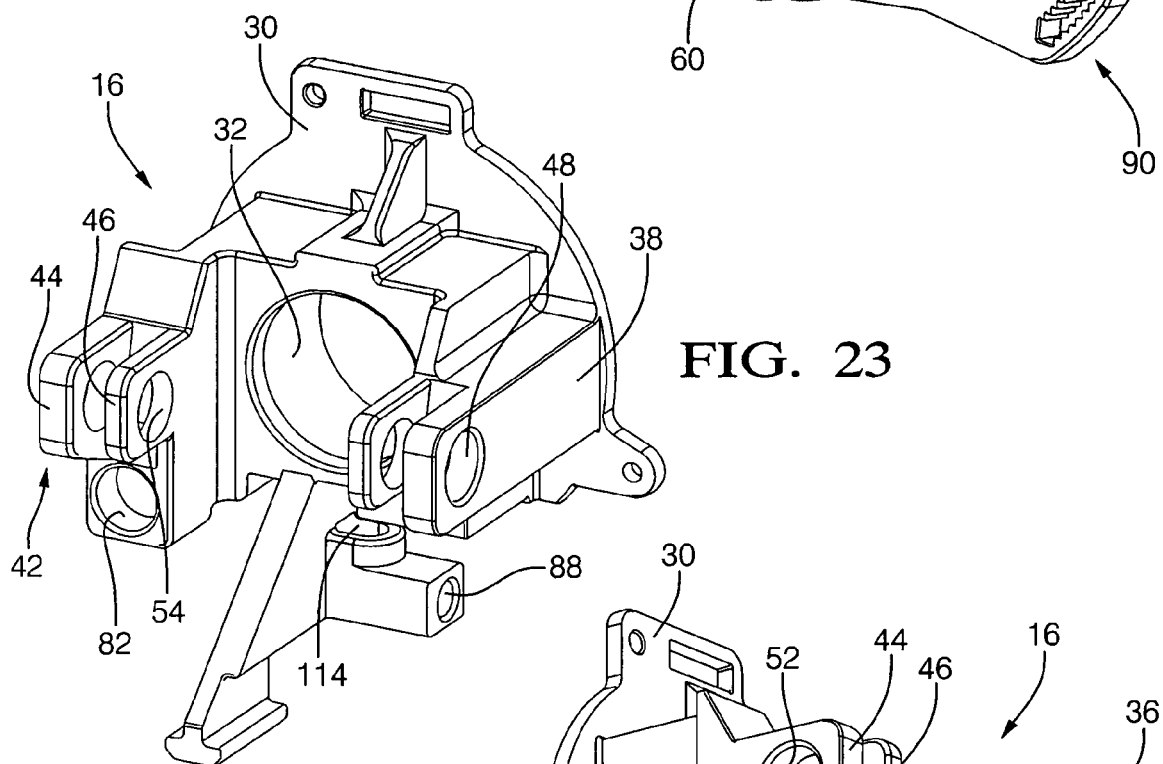
FIG. 23 is a first perspective view of the tilt housing according to the exemplary embodiment of the invention.
Figure 24:
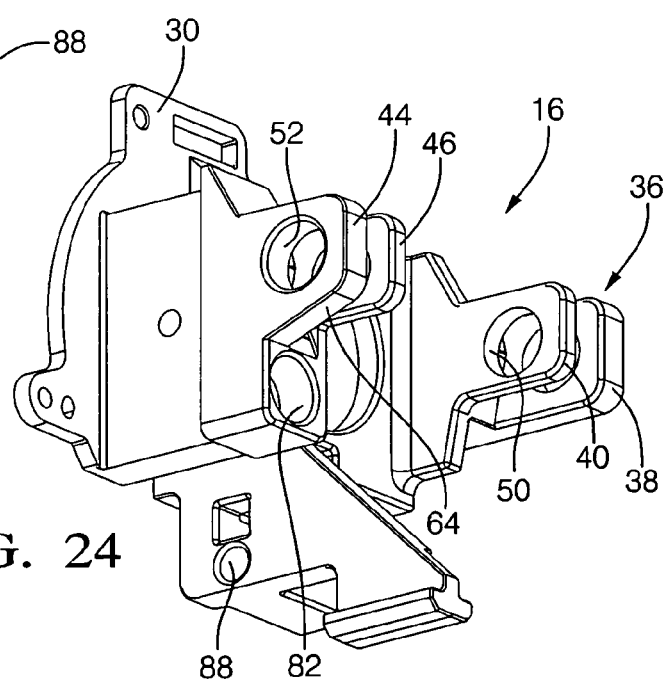
FIG. 24 is a second perspective view of the tilt housing according to the exemplary embodiment of the invention.

Referring now to FIGS. 8, 18 and 23, the lever 86 is rotatably associated with the tilt housing 16 to rotate between the locked position 106 and the unlocked position 108. The lever 86 includes a pin 112 insertable in an aperture 114 defined by the tilt housing 16. As best shown in FIGS. 5 and 20, the assembly 10 also includes a second spring 116 disposed in slot 102 to bias the lever 86 to the locked position 106.

In operation, an operator of the vehicle can grasp a gripping portion 118, as shown in FIG. 8, of the lever 86 and rotate the lever 86 from the locked position 106 to the unlocked position 108. During rotational movement of the lever 86, the second spring 116 is compressed and the pin 104 of the cam portion 100 acts against the slot 102 of the cam follower portion 98. In response to the rotation of the lever 86 and the movement of the pin 104 against the slot 102, the tip 96 of the pin 84 moves out of the slot 90.

When the tip 96 is retracted out of the slot 90, the operator of the vehicle can rotate the tilt housing 86 (which is associated with a steering wheel) relative to the inner column jacket 14 and select a desired orientation of the tilt housing 16. When the operator has selected the desired orientation of the tilt housing 16 relative to the inner column jacket 14, the operator can release the gripping portion 118 and the second spring 116 will expand and urge the pin 104 toward an end 120 of the slot 102, shown in FIG. 8. In response to rotation of the lever 86 from the unlocked position 108 to the locked position 106, the cam follower portion 98 will move toward the transverse projection 68 and the tip 96 of the pin 84 will be inserted in the slot 90, locking the tilt housing 16 with respect to the inner column jacket 14.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column for a vehicle comprising:
   a steering column jacket defining a column axis and operable to at least partially encircle a steering shaft in a vehicle;
   a tilt housing engaged with said steering column jacket for tilting movement about a tilt axis between a plurality of tilt positions;
   said tilt housing including an aperture extending transverse to said column axis;
   a locking member slidably disposed in said aperture and supported for linear movement by said tilt housing and having a tip moveable outwardly transverse to said column axis to a locked position contacting said steering column jacket and inwardly transverse to said column axis to an unlocked position spaced from said steering column jacket; and
   said steering column jacket defining a slot having an arcuate profile with said tip being spaced from said slot during tilting movement and said slot communicating with said aperture during said tilting movement to receive said tip at any one of said plurality of tilt positions with said tip contacting said slot to positively lock said steering column jacket with respect to said tilt housing.

2. The steering column of claim 1 wherein said locking member is further defined as moving with said tilt housing during said tilting movement.

3. The steering column of claim 1 wherein said arcuate slot includes opposing surfaces corresponding to a shape of said tip.

4. The apparatus of claim 1 further comprising:
   a lever engaged with said tilt housing for pivoting movement about a pivot axis between a locking position and an adjusting position wherein said lever and said locking member are disposed in cam-cam follower relationship such that said locking member moves from said unlocked position to said locked position in response to movement of said lever from said adjusting position to said locking position.

5. The steering column of claim 4 wherein said locking member includes a slot defining a cam follower portion and said lever defines a pin defining a cam portion, said pin received in said slot.

6. The steering column of claim 5 further comprising:
   a spring disposed in said slot and contacting said locking member and said lever to urge said lever to one end of said slot.

7. The steering column of claim 5 wherein said pin extends along a pin axis spaced from and parallel to said pivot axis.

8. The steering column of claim 7 wherein said lever includes a gripping portion and wherein said pin is disposed between said gripping portion and said pivot axis along said lever.

9. The steering column of claim 4 further comprising:
   a spring disposed between said locking member and said lever to concurrently urge said lever to said locking position and said locking member to said locked position.

10. A steering column for a vehicle comprising:
    a steering column jacket defining a column axis and operable to at least partially encircle a steering shaft in a vehicle;
    a tilt housing engaged with said steering column jacket for tilting movement about a tilt axis between a plurality of tilt positions, said tilt housing including an aperture extending transverse to said column axis;
    a locking member supported for linear movement by said tilt housing and having a tip moveable outwardly transverse to said column axis to a locked position contacting said steering column jacket and inwardly transverse to said column axis to an unlocked position spaced from said steering column jacket, said locking member slidably disposed in said aperture and including a slot defining a cam follower portion;
    a lever engaged with said tilt housing for pivoting movement about a pivot axis between a locking position and an adjusting position wherein said lever and said locking member are disposed in cam-cam follower relationship such that said locking member moves from said unlocked position to said locked position in response to movement of said lever from said adjusting position to said locking position, said lever including a pin defining a cam portion being received in said slot; and
    a spring disposed between a surface of said slot of said locking member and said pin of said lever to concurrently urge said lever to said locking position and said locking member to said locked position.

11. The steering column of claim 10 wherein said slot extends transverse to said aperture.

12. The steering column of claim 10 wherein said locking member moves with said tilt housing during said tilting movement and while in said unlocked position.

13. The steering column of claim 10 wherein said steering column jacket defines a slot extending along an arcuate path wherein said aperture of said tilt housing communicates with said slot of said steering column jacket throughout said tilting movement.

14. The steering column of claim 13 wherein a width of said slot of said steering column jacket varies along said arcuate path to form wider and narrower portions, said wider portions defining said plurality of tilt positions.

15. A steering column for a vehicle comprising:
    a steering column jacket defining a column axis and operable to at least partially encircle a steering shaft in a vehicle;
    a tilt housing engaged with said steering column jacket for tilting movement about a tilt axis between a plurality of tilt positions;
    said tilt housing including an aperture extending transverse to said column axis;

a locking member slidably disposed in said aperture and supported for linear movement by said tilt housing and having a tip moveable transverse to said column axis to a locked position contacting said steering column jacket and transverse to said column axis to an unlocked position spaced from said steering column jacket;

said steering column jacket defining a slot having an arcuate shape and communicating with said aperture during said tilting movement to receive said tip at any one of said plurality of tilt positions;

a lever engaged with said tilt housing for pivoting movement about a pivot axis between a locking position and an adjusting position wherein said lever and said locking member are disposed in cam-cam follower relationship such that said locking member moves from said unlocked position to said locked position in response to movement of said lever from said adjusting position to said locking position; and a spring disposed between said locking member and said lever to concurrently urge said lever to said locking position and said locking member to said locked position.

* * * * *